(12) United States Patent
Howard

(10) Patent No.: US 11,664,889 B2
(45) Date of Patent: May 30, 2023

(54) COMMUNICATIONS IN A WIRELESS NETWORK

(71) Applicant: Intellectual Ventures II LLC, Wilmington, DE (US)

(72) Inventor: Paul Howard, Bristol (GB)

(73) Assignee: Intellectual Ventures II LLC, Wilmington, DE (US)

( * ) Notice: Subject to any disclaimer, the term of this patent is extended or adjusted under 35 U.S.C. 154(b) by 0 days.

(21) Appl. No.: 17/870,425

(22) Filed: Jul. 21, 2022

(65) Prior Publication Data

US 2022/0360325 A1    Nov. 10, 2022

Related U.S. Application Data

(63) Continuation of application No. 17/583,369, filed on Jan. 25, 2022, now Pat. No. 11,411,642, which is a
(Continued)

(51) Int. Cl.
| | |
|---|---|
| *H04B 7/26* | (2006.01) |
| *H04W 72/04* | (2023.01) |
| *H04W 72/12* | (2023.01) |
| *H04W 52/14* | (2009.01) |
| *H04J 3/16* | (2006.01) |

(Continued)

(52) U.S. Cl.
CPC .......... *H04B 7/2643* (2013.01); *H04J 3/1694* (2013.01); *H04L 5/0053* (2013.01); *H04W 52/146* (2013.01); *H04W 72/042* (2013.01); *H04W 72/0406* (2013.01);
(Continued)

(58) Field of Classification Search
CPC ... H04J 3/1694; H04L 5/0053; H04W 52/146; H04W 72/0406; H04W 72/042; H04W 72/0446; H04W 72/121; H04W 72/1289
See application file for complete search history.

(56) References Cited

U.S. PATENT DOCUMENTS

| | | |
|---|---|---|
| 5,056,109 A | 10/1991 | Gilhousen et al. |
| 5,265,119 A | 11/1993 | Gilhousen et al. |
| | (Continued) | |

FOREIGN PATENT DOCUMENTS

| | | |
|---|---|---|
| DE | 10201270 | 8/2002 |
| EP | 1467582 | 10/2004 |
| | (Continued) | |

OTHER PUBLICATIONS

"3 UMTS Interfaces," UMTS Protocols and Protocol Testing, pp. 9-14, located at <http://www.tek.com/Measurement/App.sub.--Notes/2F.sub.--14251/eng/in!-erfaces.pdf>.
(Continued)

*Primary Examiner* — Ronald B Abelson
(74) *Attorney, Agent, or Firm* — Volpe Koenig

(57) ABSTRACT

A user equipment (UE) is configured to receive a control message over a physical control channel in a first time slot, wherein the control message has power control bits for a plurality of UEs, wherein the plurality of UEs include the first UE. The UE is further configured to extract power control information for the first UE from the control message, and to transmit a signal over a physical control channel to a base station in a second time slot at a transmission power level based on the extracted power control information.

16 Claims, 5 Drawing Sheets

Related U.S. Application Data continuation of application No. 17/339,550, filed on Jun. 4, 2021, now Pat. No. 11,239,908, which is a continuation of application No. 16/682,854, filed on Nov. 13, 2019, now Pat. No. 11,032,000, which is a continuation of application No. 14/458,693, filed on Aug. 13, 2014, now Pat. No. 11,044,010, which is a continuation of application No. 13/176,298, filed on Jul. 5, 2011, now Pat. No. 8,811,356, which is a continuation of application No. 11/646,692, filed on Dec. 27, 2006, now Pat. No. 8,009,639.

(51) Int. Cl.
| | | |
|---|---|---|
| *H04L 5/00* | (2006.01) | |
| *H04W 72/121* | (2023.01) | |
| *H04W 72/0446* | (2023.01) | |
| *H04W 52/54* | (2009.01) | |

(52) U.S. Cl.
CPC ..... *H04W 72/0446* (2013.01); *H04W 72/121* (2013.01); *H04W 72/1289* (2013.01); *H04W 52/54* (2013.01)

(56) References Cited

U.S. PATENT DOCUMENTS

| | | | |
|---|---|---|---|
| 5,485,486 | A | 1/1996 | Gilhousen et al. |
| 6,061,784 | A | 5/2000 | Tarsky et al. |
| 6,567,459 | B1 | 5/2003 | Hakkinen et al. |
| 6,611,509 | B1 | 8/2003 | Hayashi et al. |
| 6,754,505 | B1 | 6/2004 | Baker et al. |
| 6,978,151 | B2 | 12/2005 | Choi et al. |
| 7,120,134 | B2 | 10/2006 | Tiedemann, Jr. et al. |
| 7,180,902 | B1 | 2/2007 | Raaf et al. |
| 7,215,657 | B2 | 5/2007 | Toshimitsu et al. |
| 8,009,639 | B2 | 8/2011 | Howard |
| 8,072,916 | B2 | 12/2011 | Dateki |
| 2001/0012276 | A1 | 8/2001 | Tsunehara et al. |
| 2001/0026543 | A1 | 10/2001 | Hwang et al. |
| 2001/0048711 | A1 | 12/2001 | Sun et al. |
| 2002/0061005 | A1 | 5/2002 | Lee et al. |
| 2002/0061768 | A1* | 5/2002 | Liang ............ H04M 1/00 |
| 2002/0075891 | A1 | 6/2002 | Souissi |
| 2002/0077151 | A1 | 6/2002 | Matthews et al. |
| 2002/0085522 | A1 | 7/2002 | Huber |
| 2002/0094834 | A1 | 7/2002 | Baker et al. |
| 2002/0105929 | A1 | 8/2002 | Chen et al. |
| 2002/0114311 | A1 | 8/2002 | Mazur et al. |
| 2002/0119798 | A1 | 8/2002 | Hamabe |
| 2002/0136193 | A1 | 9/2002 | Chang et al. |
| 2002/0150058 | A1 | 10/2002 | Kim et al. |
| 2002/0168993 | A1 | 11/2002 | Choi et al. |
| 2002/0172208 | A1 | 11/2002 | Malkamaki |
| 2002/0196766 | A1 | 12/2002 | Hwang et al. |
| 2003/0022683 | A1 | 1/2003 | Beckmann et al. |
| 2003/0054850 | A1 | 3/2003 | Masseroni et al. |
| 2003/0069020 | A1 | 4/2003 | Speight |
| 2004/0022213 | A1 | 2/2004 | Choi et al. |
| 2004/0152473 | A1 | 8/2004 | Kuwano et al. |
| 2004/0170132 | A1 | 9/2004 | Shin et al. |
| 2004/0203419 | A1 | 10/2004 | Crocker et al. |
| 2005/0002360 | A1 | 1/2005 | Lamontagne et al. |
| 2005/0013287 | A1 | 1/2005 | Mallentin et al. |
| 2005/0022098 | A1 | 1/2005 | Vayanos et al. |
| 2005/0058103 | A1 | 3/2005 | Jeong et al. |
| 2005/0222948 | A1 | 10/2005 | Sato et al. |
| 2006/0093026 | A1 | 5/2006 | Montojo et al. |
| 2006/0211417 | A1 | 9/2006 | Pedlar |
| 2006/0221809 | A1 | 10/2006 | Malladi et al. |
| 2007/0058595 | A1 | 3/2007 | Classon et al. |
| 2007/0173256 | A1 | 7/2007 | Laroia et al. |
| 2007/0177656 | A1 | 8/2007 | Maruta et al. |
| 2007/0265017 | A1 | 11/2007 | Ishii et al. |
| 2008/0090528 | A1 | 4/2008 | Malladi |
| 2008/0144600 | A1 | 6/2008 | Anderson |
| 2009/0262711 | A1 | 10/2009 | Ahn et al. |

FOREIGN PATENT DOCUMENTS

| | | | |
|---|---|---|---|
| EP | 1615384 | 1/2006 | |
| EP | 1681780 | 7/2006 | |
| GB | 2417167 | * 2/2006 | ............... H04Q 7/32 |
| JP | 11261544 | 9/1999 | |
| JP | 2006197318 | 7/2006 | |
| WO | 2005083897 | 9/2005 | |
| WO | 2006015984 | 2/2006 | |
| WO | 2006019263 | 2/2006 | |
| WO | 2006063138 | 6/2006 | |

OTHER PUBLICATIONS

"3rd Generation Partnership Project; Technical Specification Group Radio Access Network; Feasibility Study for Evolved UTRA and UTRAN (Release 7)," (Mar. 2006). 3GPP: Valbonne, France, TS 25.912 v0.0.4:1-13.

"3rd Generation Partnership Project; Technical Specification Group Services and System Aspects; 3GPP System Architecture Evolution: Report on Technical Options and Conclusions (Release 7)," (Jul. 2005). 3GPP: Valbonne, France, TS 23.882 v0.3.0:1-13.

"3rd Generation Partnership Project; Technical Specification Group Services and System Aspects; General UMTS Architecture (3G TS23.101 version 3.0.1)," (Apr. 1999). 3GPP: Valbonne, France, TS 23.101 v3.0.1, 1-13.

3rd Generation Partnership Project; Technical Specification Group Services and System Aspects; Multimedia Broadcast/Multicast Service (MBMS); Architecture and Functional Description (Release 6); 3GPP: Valbonne, France; 3GPP TS 23.246 v.6.4.0 (Sep. 2004).

"UMTS Protocols and Protocol Testing," Tektronix, The International Engineering Consortium, pp. 1-45, located at <http://www.rfpeople.com/docs/umts.pdf>.

3rd Generation Partnership Project. "Technical Specification Group Radio Access Network; Radio Resource Control (RRC); Protocol Specification (Release 7)," 3GPP TS 25.331 V7.3.0, Dec. 2006.

Advisory Action, U.S. Appl. No. 14/458,693, dated Aug. 25, 2016.

Examiner's Answer to Appeal Brief, U.S. Appl. No. 14/458,693, dated Nov. 23, 2018.

Final Rejection issued by USPTO, dated Nov. 19, 2009 for U.S. Appl. No. 11/646,692.

Final Rejection, U.S. Appl. No. 13/176,298, dated Nov. 6, 2013.

Final Rejection, U.S. Appl. No. 14/458,693, dated May 10, 2016.

Final Rejection, U.S. Appl. No. 14/458,693, dated Mar. 21, 2017.

Final Rejection, U.S. Appl. No. 14/458,693, dated May 17, 2018.

Final Rejection, U.S. Appl. No. 16/682,854, dated Jul. 1, 2020.

Ghadialy, Z. "Tutorial: Medium Access Control (MAC) in 3G/UMTS Protocol Stack," located at <http://www.3g4g.co.ukl Tutoriai/ZG/zg.sub.--mac.html> visited on Jun. 20, 2007. (9 pages).

International Engineering Consortium. "Universal Mobile Telecommunications System (UMTS) Protocols and Protocol Testing," located at <http://www.iec.org/online/tutorials/umts/topic02.html> visited on Jun. 20, 2007. (7 pages).

International Preliminary Report on Patentability dated Jun. 30, 2009 from PCT Application No. PCT/EP20071064483.

Miscellaneous Communication to Applicant, U.S. Appl. No. 14/458,693, dated May 20, 2016.

Non-Final Rejection issued by USPTO, dated May 14, 2009 for U.S. Appl. No. 11/646,692.

Non-Final Rejection issued by USPTO, dated May 28, 2010 for U.S. Appl. No. 11/646,692.

Non-Final Rejection, U.S. Appl. No. 13/176,298, dated Jul. 24, 2013.

Non-Final Rejection, U.S. Appl. No. 13/176,298, dated Apr. 10, 2013.

Non-Final Rejection, U.S. Appl. No. 14/458,693, dated Dec. 30, 2015.

Non-Final Rejection, U.S. Appl. No. 14/458,693, dated Dec. 2, 2016.

(56) References Cited

OTHER PUBLICATIONS

Non-Final Rejection, U.S. Appl. No. 14/458,693, dated Oct. 23, 2017.
Non-Final Rejection, U.S. Appl. No. 16/682,854, dated Feb. 7, 2020.
Non-Final Rejection, U.S. Appl. No. 16/682,854, dated Oct. 21,2020.
Notice of Allowance issued by USPTO, dated Feb. 2, 2011 for U.S. Appl. No. 11/646,692.
Notice of Allowance issued by USPTO, dated May 17, 2011 for U.S. Appl. No. 11/646,692.
Notice of Allowance, U.S. Appl. No. 13/176,298, dated Apr. 15, 2014.
Notice of Allowance, U.S. Appl. No. 14/458,693, dated Nov. 16, 2015.
Notice of Allowance, U.S. Appl. No. 16/682,854, dated Feb. 4, 2021.
Notice of Allowance, U.S. Appl. No. 17/339,550, dated Sep. 30, 2021.
Notice of Allowance, U.S. Appl. No. 17/583,369, dated Apr. 12, 2022.
Office Action, Japanese Patent Application No. 2009-543459, dated Dec. 18, 2012.
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V0.3.1 (Nov. 2006).
Third Generation Partnership Project, "Technical Specification Group Radio Access Network; Physical Channels and Modulation (Release 8)," 3GPP TS 36.211 V0.2.1 (Nov. 2006).
Third Generation Partnership Project, "Technical Specification Group Radio Access Network; Physical layer procedures (Release 8)," 3GPP TS 36.213 V0.1.0 (Oct. 2006).
Third Generation Partnership Project, "Technical Specification Group Radio Access Network; Multiplexing and channel coding (Release 8)," 3GPP TS 36.212 V0.2.1 (Nov. 2006).

* cited by examiner

COMMUNICATIONS IN A WIRELESS NETWORK

CROSS REFERENCE TO RELATED APPLICATIONS

This application is a continuation of U.S. patent application Ser. No. 17/583,369, filed Jan. 25, 2022, which will issue as U.S. Pat. No. 11,411,642 on Aug. 9, 2022, which is a continuation of Ser. No. 17/339,550, filed Jun. 4, 2021 which issued as U.S. Pat. No. 11,239,908 on Feb. 1, 2022, which is a continuation of U.S. patent application Ser. No. 16/682,854, filed Nov. 13, 2019, which issued as U.S. Pat. No. 11,032,000 on Jun. 8, 2021, which is a continuation of U.S. patent application Ser. No. 14/458,693, filed Aug. 13, 2014, which issued as U.S. Pat. No. 11,044,010 on Jun. 22, 2021, which is a continuation of U.S. patent application Ser. No. 13/176,298, filed Jul. 5, 2011, which issued as U.S. Pat. No. 8,811,356 on Aug. 19, 2014, which is a continuation of U.S. patent application Ser. No. 11/646,692, filed Dec. 27, 2006, which issued as U.S. Pat. No. 8,009,639 on Aug. 30, 2011, which are all incorporated by reference as if fully set forth.

BACKGROUND OF THE INVENTION

Time division-code division multiple access (TD-CDMA) is an air interface technology that combines the benefits of the three elemental concepts in a universal mobile telecommunication system (UMTS): time division multiple access (TDMA); code division multiple access (CDMA); and time division duplex (TDD). TDD, in particular, uses the same radio channel for both uplink and downlink communications, and discriminates between signals by separating the transmissions in time. One of the benefits obtained by operating both links on the same frequency is the ability to exploit channel reciprocity.

Channel reciprocity gives equipment the ability to derive information about uplink channel conditions from downlink channel conditions based upon signals received by the user equipment (UE). Pathloss is one example of channel information that can be obtained from channel reciprocity. Knowledge of the uplink pathloss enables open-loop power control to be employed for uplink transmissions. For example, uplink power control is important for the operation of the CDMA element of TD-CDMA as it counteracts the near-far effect that would otherwise be encountered if all UEs transmitted at a fixed power regardless of the uplink pathloss.

The open-loop uplink power control feature provides a significant advantage when coupled with a multiple access data transmission system that is used for packet-based communication and/or shared channels. When access to a limited number of uplink channels is shared between a large population of terminals it is imperative that access to the channels can be switched between terminals with minimal latency. A data terminal that can derive information needed to access uplink channels from the downlink transmissions (beacon signals) has a significant advantage over a terminal that relies on the (lengthy) configuration of a dedicated channel in order to establish a feedback channel.

However, channel reciprocity cannot always be guaranteed. For example TDD transmissions may not be permitted in certain frequency spectrum allocations; this is a regulatory issue and may be used to protect other wireless equipment in the same or adjacent frequency bands. In these situations the correlation between uplink and downlink channels is lost because the channels are transported on carrier frequencies that are separated in frequency by an amount that is greater than the coherence bandwidth of the channel (usually, only a few MHz separation is sufficient to cause the uplink and downlink fading profiles to be independent).

In high speed mobile applications, the time delay between downlink and uplink transmissions may exceed the coherence time of the channel. The maximum time delay that can be tolerated is a function of the mobile speed and the RF carrier frequency used, with the coherence time reducing with increasing speed and RF carrier frequency. Also, the use of multiple transmit and/or receive antennas at the network and/or the mobile terminal can introduce unintentional decorrelation between the uplink and downlink channels.

If the TD-CDMA air interface is to be used in applications where the correlation between the uplink and downlink path loss is not guaranteed, then it would be advantageous to find a substitute for channel reciprocity.

BRIEF SUMMARY OF THE INVENTION

Although it is desirable to support air interfaces where the pathloss is not reciprocal, known conventional methods do not deal directly with the evolution or adaptation of an air interface that uses channel reciprocity to deliver key features and advantages where channel reciprocity is not guaranteed. The adaptation provided in embodiments of the invention introduces a new technique for uplink channel control that uses a feedback scheme as a substitute for the absence of channel reciprocity, with minimal impact on the ability of the air interface to support uplink shared channels.

Embodiments of the present invention enable active feedback control between a base station and user equipment (UE). In particular, the operation of a system designed for TDD, or unpaired operation, is expanded to operate in FDD, or paired, mode. For example, an uplink beacon function (for power control) and a modified random access process substitute for the information lost due to the lack of channel reciprocity in paired operation. Embodiments of the invention allow a terminal to transmit the uplink physical channel control signal (UL_Beacon) independently from the uplink physical channel. Therefore, the implementation of closed loop feedback may operate in the absence of an uplink physical channel. In one embodiment, a UE allocates a time slot for a beacon signal separated from the time slots for data in a frame. A second time slot is allocated within the frame for the base station to transmit a control signal in response to the beacon signal. The control signal instructs the UE to adjust a transmission parameter.

A UL_Beacon signal may be combined with a physical layer common control channel (PLCCH) to form a feedback system. A dedicated timeslot groups all of the UL_Beacon signals from multiple UEs in a specific uplink timeslot. By grouping the UL_Beacon signals together, embodiments obtain separation between the UL_Beacon signals and the standard uplink physical channels. Additionally, in a synchronous system embodiments of the invention detect and cancel the UL_Beacon signals from other cell sites (inter-cell interference). The PLCCH carries feedback information to the UEs that are transmitting UL_Beacon signals. The PLCCH can share a timeslot with other physical channels by exploiting the CDMA aspect of the system.

In other embodiments, the number of supported UEs can be increased by fractionating the use of the UL_Beacon and PLCCH across a multiframe period. Fractionation may also prevent timeslot blocking where half duplex UEs have a long UL/DL switching time. Additionally, support for half duplex terminals is implicit due to the nature of the TDMA frame structure. The system may manage the allocation of resource across the population of terminals such that the full capacity of the base station can be utilized even when only half-duplex terminals are deployed. In embodiments of the invention, full-duplex terminals can be still be supported along with half duplex UEs.

Moreover, in other embodiments, a radio resource control (RRC) connected state covers the subset of terminals that are in cell forward access channel (Cell_FACH), which are also transmitting UL_Beacon and receiving PLCCH, thus creating an active control feedback channel. Management of the UEs that are in Cell_Active state may remove users that are less active, and may add users that are newly active while retaining users that may have on-going data transfer requirements.

DETAILED DESCRIPTION OF THE INVENTION

Figure 1:
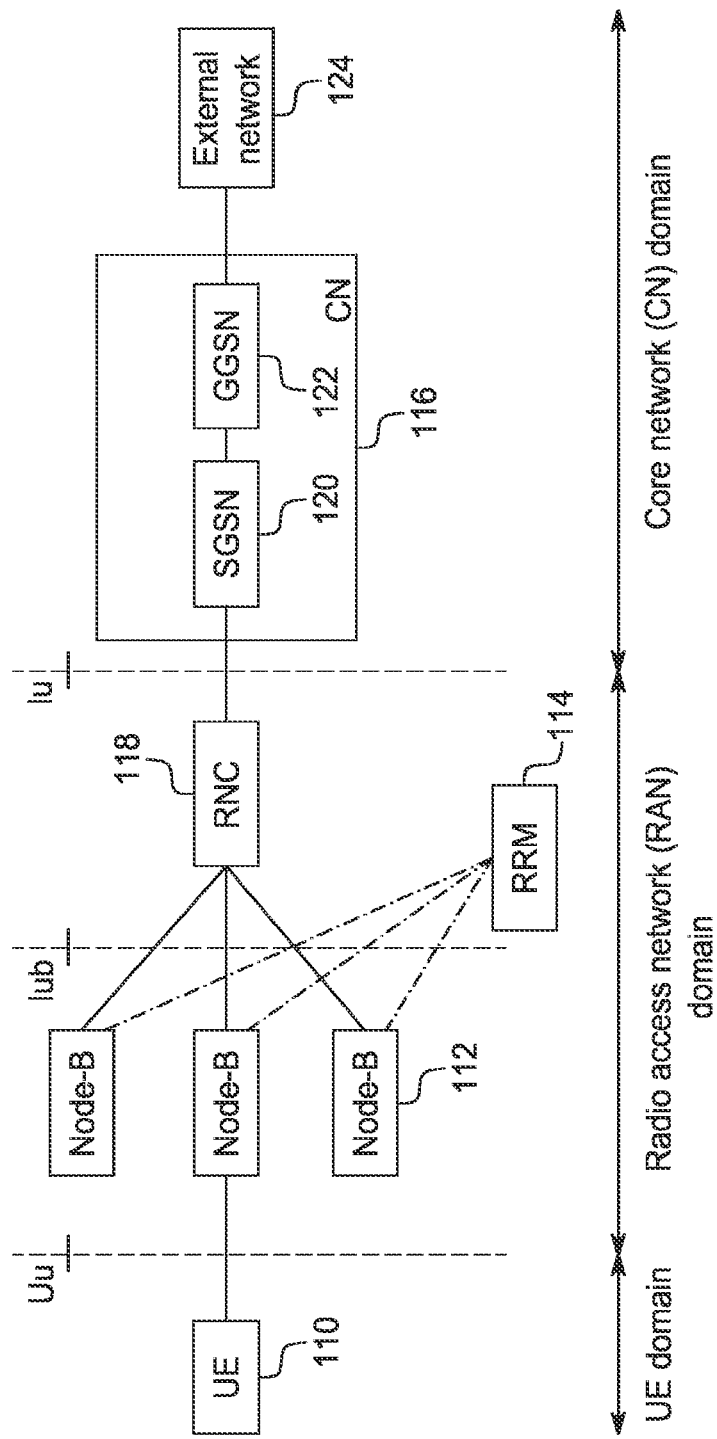
FIG. 1 illustrates a cellular communication system according to embodiments of the invention.

FIG. 1 illustrates an example of a cellular communication system according to embodiments of the invention. The network includes a user equipment (UE) domain, a radio access network (RAN) domain, and a core network domain. The UE domain includes user equipment 110 that communicate with at least one base station 112 in the RAN domain via a wireless interface. The RAN domain may also include a network controller (RNC) 118 (e.g., radio network controller), such as that used in UMTS systems. Alternatively, such functionality may be distributed between the Node Bs and an access gateway (AGW) (not shown) or other controller in the core network. FIG. 1 also illustrates an optional radio resource manager (RRM) 114. The RRM may perform functions otherwise performed by the Node Bs or an AGW in some embodiments.

The core network (CN) 116 includes, in this example, a serving GPRS support node (SGSN) 120, and a gateway GPRS support node (GGSN) 122. The core network is coupled to an external network 124. The SGSN 120 is responsible for session control, including keeping track of the location of the UEs. The GGSN 122 concentrates and tunnels user data within the core network 116 to the ultimate destination (e.g., an Internet service provider) in the external network 124. Further details may be found in the 3GPP UMTS technical specifications, such as TS23.246 v6.4.0 "3rd Generation Partnership Project; Technical Specification Group Services and System Aspects; Multimedia Broadcast/ Multicast Service (MBMS); Architecture and Functional Description (Release 6)," published by the 3GPP Support Office, 650 Route des Lucioles—Sophia Antipolis, Valbonne—FRANCE, which are incorporated by reference herein.

Further details regarding exemplary communications systems that may implement embodiments of the invention may be found in 3GPP UMTS technical specifications, such as TR 23.882, "3GPP System Architecture Evolution: Report on Technical Options and Conclusions"; TR 25.912, "Feasibility Study for Evolved UTRA and UTRAN"; TS 23.101, "General Universal Mobile Telecommunications System (UMTS) Architecture," all of which are incorporated by reference herein.

TDD to FDD Evolution

A system designed for operation in Time Division Duplex (TDD) mode has base stations and terminals that transmit and receive at orthogonal points in time. In normal operation terminals are in receive mode when the base station is transmitting, and base stations are in receive mode when terminals are transmitting. In conventional TDD implementations, neither base stations nor the terminals are able to transmit and receive at the same points in time because the same frequency is used for uplink and downlink communication.

Such a system can be adjusted to operate in Frequency Division Duplex (FDD) mode, where the uplink and downlink communications occur on different frequencies. According to embodiments of the invention, to make full and efficient use of the frequency spectrum resources, the base stations are adapted to transmit and receive at the same time. This is possible since the uplink and downlink communications now occur on different frequencies. The terminals, however, retain the restriction of transmitting and receiving at orthogonal points in time to retain the simplicity of not having to transmit and receive at the same time (e.g., no duplexer required). The full use of the frequency spectrum is then obtained by allocating the resource across a plurality of terminals.

Additional measures may be needed if there are aspects of the air interface that rely on the channel reciprocity that can be assumed for TDD systems. In the case of TD-CDMA, modifications may be made for the correct operation of uplink power control and rate adaptation. This can be achieved by defining an uplink physical control channel used for estimating the uplink channel conditions and a downlink channel used to feed back control information to the terminal. These channels may not need an associated data physical channel to be operational.

Modifications may be made to the random access channel. This may be achieved by introducing an additional indicator step at the start of any physical random access. A new uplink physical channel carries the random access indicators. A new downlink physical channel carries the response to received uplink indicators.

Uplink Physical Channel Control Signal

When pathloss reciprocity is not available, the combination of an uplink physical channel control signal with a downlink feedback channel may be used to keep the terminal informed of the condition of the uplink channel. The uplink physical control signal is referred to herein as an "Uplink Beacon" (UL_Beacon).

In general, a system that supports shared channels may also support shared access to a large number of terminals. To extract the maximum benefit from the resulting trunking gain, shared channels can be quickly and efficiently reallocated between the population of UEs. To obtain rapid access to the uplink shared channels, terminals can transmit at the correct power with their first transmission so that latency can be kept to a minimum.

According to embodiments of the invention, the RNC or other controller (e.g., other controller having its functionality in the core network) allocates resources so that the physical channel control signal is separate from the uplink (shared) physical channel. Thus, terminals are able to transmit an UL_Beacon independently of their access to the uplink shared channel. The system may implement a closed loop control system, in which the base station detects the received power and/or other channel information from the UL_Beacon, and sends controlling commands back to each terminal to keep the terminal informed of the channel conditions observed at the base station.

In certain embodiments, the closed loop control system is simply based on the UL_Beacon power received at the base station. The base station may send power control commands on a shared downlink channel to each terminal based on the power received from the UL_Beacon signal. Each power control command may, for example, indicate whether terminal power should be increased or decreased by a predetermined amount. This downlink channel is referred to as the "Physical Layer Control Channel" (PLCCH). The capacity of the PLCCH may be matched to the number of bits required in the feedback field and the number of UL_Beacon signals that can be simultaneously supported. That is, each UL_Beacon may correspond to one bit of the PLLCH. All terminals transmitting UL_Beacon signals may receive this channel and extract the relevant feedback field.

It is possible to extend the complexity of the control loop by sending control commands based on other aspects of the UL_Beacon signal as received by the base station, such as time-of-arrival, and channel impulse response. The amount of resource that is required for the feedback channel increases with the size (in bits) of the feedback information to each UE.

For example, for air interface technologies with a TDMA element, it is possible to adapt the TDMA frame structure to provide separation between the UL_Beacon and the normal physical channels by dedicating at least one uplink time slot per frame (or at least one time slot per multi-frame) to carrying UL_Beacon signals.

By placing UL_Beacon signals in a dedicated timeslot, a dedicated detection scheme can be applied which may include performance enhancing features such as intra-cell cancelling (for alleviating the effects of cross-correlation interference between UL_Beacon signals transmitted by multiple terminals in the same cell), or inter-cell cancelling (for reducing the interference from neighboring cells in the case where the UL_Beacon timeslots are time synchronized). Cross-interference between UL_Beacon and normal uplink bursts is avoided by the separation obtained from the use of separate time slots.

Those skilled in the art will recognize that there are a large number of possibilities for the arrangement of a UL_Beacon and its associated PLCCH within the frame structure according to embodiments of the invention. More than one UL_Beacon and PLCCH per frame could be supported if the feedback update rate is required to be faster than the frame rate (at the expense of system capacity). For system applications that can tolerate a slower feedback rate, embodiments may fractionate the use of the UL_Beacon timeslot (and the associated PLCCH).

When fractionation is employed, the RNC or other controller may allocate the UL_Beacon timeslot in a given frame to a group of terminals depending on the current fractionation phase, thus increasing the number of terminals that can be supported with active physical channel feedback control. The maximum fractionation cycle length may be determined by the feedback update rate that the system requires in order to meet its performance targets.

Figure 2:
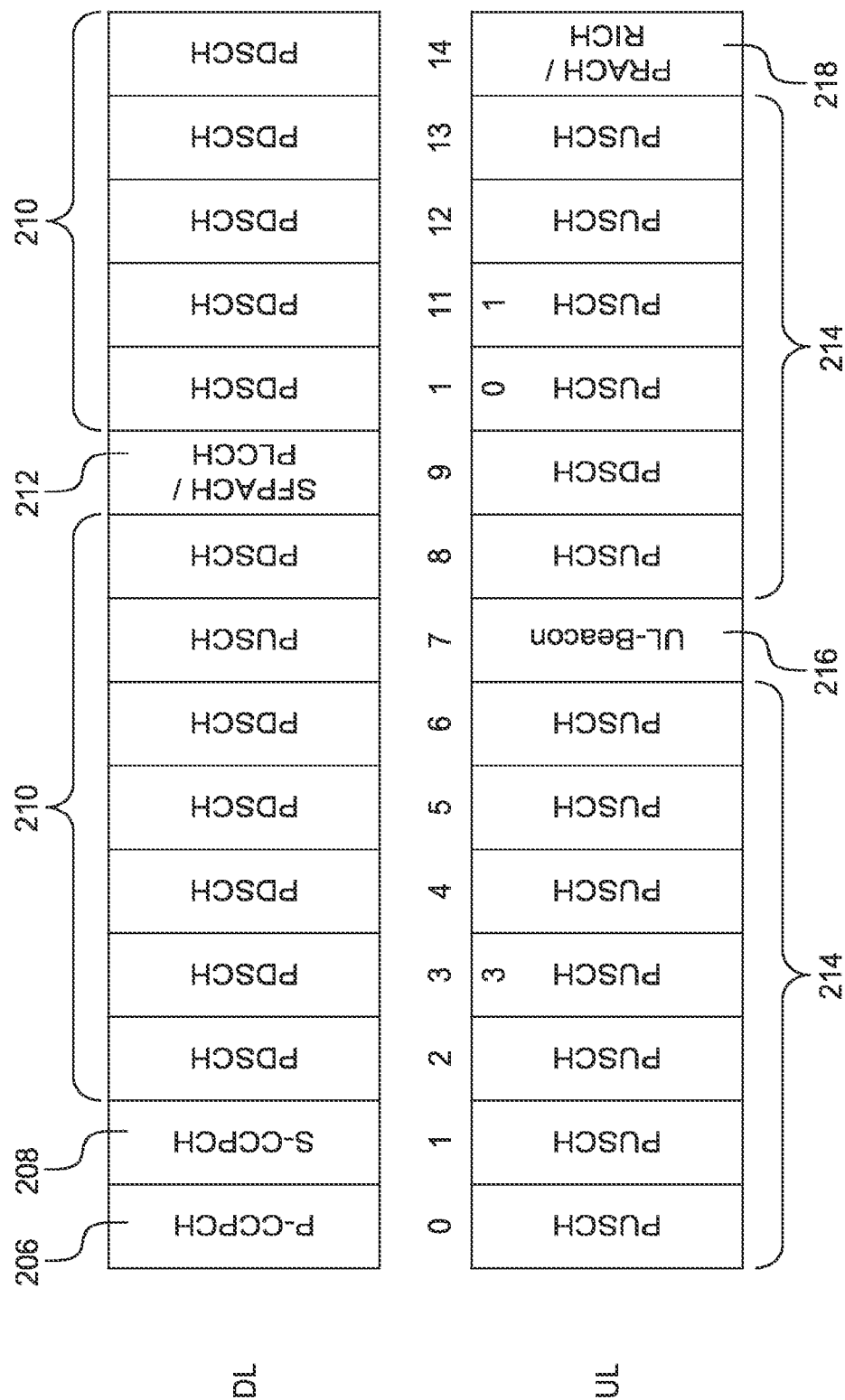
FIG. 2 illustrates a timeslot arrangement for uplink and downlink messages supporting the UL_Beacon and its corresponding PLCCH within a TD-CDMA frame structure modified to support FDD according to embodiments of the invention.

FIG. 2 illustrates an example of a timeslot arrangement supporting the UL_Beacon and its corresponding PLCCH within a TD-CDMA frame structure modified to support FDD. In this example, the PLCCH 212 shares a timeslot with another downlink shared channel. This is possible since normal downlink physical channels are used to transmit the PLCCH. The downlink frame also comprises a downlink beacon timeslot 206, an access control timeslot 208, and normal traffic carrying timeslots 210. The uplink frame comprises a UL_Beacon control timeslot 216, an access control timeslot 218, and normal traffic carrying timeslots 214.

Figure 3:
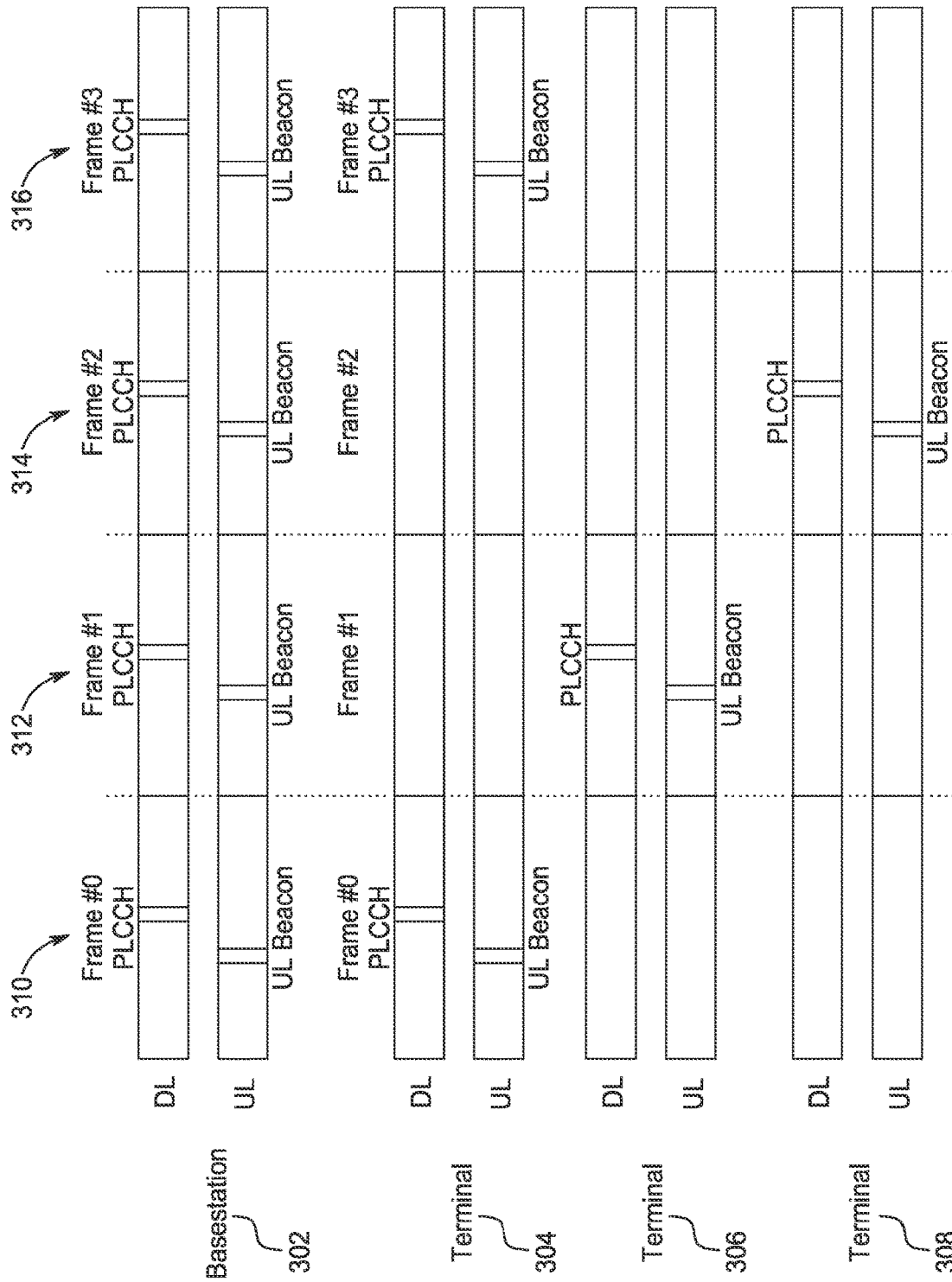
FIG. 3 illustrates fractionation in different frames at the base station according to embodiments of the invention.

FIG. 3 illustrates an example where fractionation is employed. The UL_Beacon and PLCCH timeslots are active in every frame at the base station 302. However, terminal 304, terminal 306, and terminal 308 have been assigned a different fractionation phase. FIG. 3 illustrates the case where the fractionation phase is 3. For example, the fractionation phase of terminal 304 occurs in frame #0 310, the fractionation phase of terminal 306 occurs in frame #1 312, and the fractionation phase of terminal 308 occurs in frame #2 314. Since the fractionation phase is 3, the phase for terminal 304 occurs again in frame #3 316.

Half Duplex Terminals

Embodiments of the invention enable terminals to operate in half duplex or full duplex mode. In a half duplex system, base stations and terminals do not transmit and receive simultaneously. When such a system is evolved to operate in paired spectrum, it becomes inefficient if base stations retain their half duplex operation. It is not necessarily inefficient for the terminals to do so, however, since half duplex operation may have some advantages in the design and implementation of the terminal.

Nonetheless, there are some points that should be considered. For example, a single terminal may not be able to access all transmit and all receive slots. Therefore, the system may have to manage resources across the population of terminals to ensure all the available resources at the base station are efficiently utilized. To prevent blocking of timeslots, half duplex terminals may be operated with a fractionation cycle of greater than one. In particular, this may also apply for the case where there are more than one UL_Beacon timeslot per frame. There is a time delay for half duplex terminals to switch between transmit and receive functions. In some cases this delay exceeds the guard period inserted between consecutive timeslots. In the half duplex terminal case, the terminal is unable to transmit and receive on adjacent timeslots. This will affect the locations of the UL_Beacon, PLCCH, and other common channels. Accordingly, the timeslot arrangement may be adjusted when the system is configured.

Terminal Management

Embodiments of this invention separate uplink control from the uplink physical traffic. This allows the control feedback to operate even when the terminal does not have data to send, with the consequence that uplink shared channels can be used with maximum efficiency.

To use shared channels efficiently, a relatively large user base may be needed. At the same time, the network resources required to support the control feedback channels for these terminals need to be minimized. In general, the number of users that can be supported with active control feedback channels is smaller than the typical number of users per cell. Therefore, the terminals in this active state may be managed.

Figure 4:
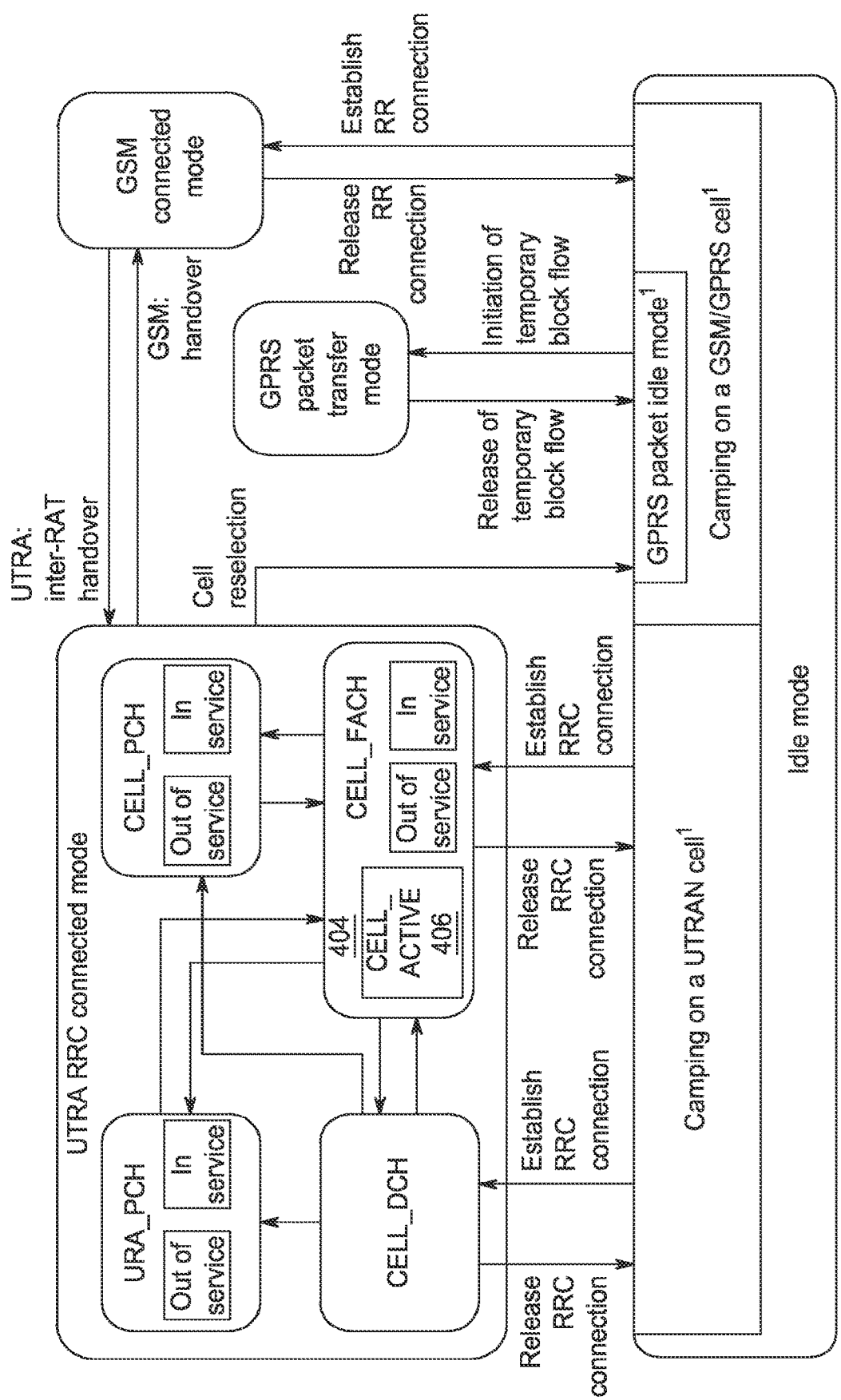
FIG. 4 illustrates UTRA RRC connected modes according to embodiments of the invention.

In UMTS terminology, embodiments of the invention provide a new Universal Terrestrial Radio Access-Radio Resource Control-Connected (UTRA RRC-Control) sub-state into the system. UTRA systems already support the idea of different RRC-Connected states (see, TS25.331 Radio Resource Control (RRC) Protocol Specification, which is incorporated herein by reference), e.g., CELL_DCH, CELL_FACH etc. This sub-state is referred to as the CELL_ACTIVE state. FIG. 4 illustrates this sub-state in context with other UTRA RRC-connected states. A UE in a Cell_Active sub-state transmits the physical channel control part of the uplink physical channel only, and nothing else (i.e., no data).

As shown in FIG. 4, CELL_ACTIVE sub-state is a sub-state of CELL_FACH state 404. In general, UEs in CELL_FACH state have an RRC connection, but they may not be actively transferring data. Out of the population of UEs in CELL_FACH state 404, a smaller number of UEs, determined by the network to be the most-active UEs, are supported in a CELL_ACTIVE state 406. In this state, the UEs transmit the physical channel control signal and listen to the associated feedback channel from the network. Because the UE is aware of the uplink pathloss conditions from the feedback channel, it can have instant access to the uplink shared channels, and the resource allocator (controller) in the network can treat the UE accordingly.

The rules governing which UEs are maintained in CELL_ACTIVE state are decided by the network (e.g., through the RNC) and may be based on factors such as the volume of data transfer required by the UE, the data transfer rate required by a UE, the frequency of short bursts of data transfer, the total number of UEs in CELL_FACH state, the time since the last data transfer, the UE power saving requirements, etc.

Note that UEs in CELL_ACTIVE state have their transmitters active, therefore it is necessary for these UEs to monitor the status of the downlink and automatically come out of CELL_ACTIVE state if the downlink is deemed to be out-of-synchronization (for example, very high downlink errors or low received signal strength). This feature prevents UEs continuing to transmit in a state where the feedback channel may be unreliable and thus causing interference.

While the invention has been described in terms of particular embodiments and illustrative figures, those of ordinary skill in the art will recognize that the invention is not limited to the embodiments or figures described. Although embodiments of the present invention are described, in some instances, using UMTS terminology, those skilled in the art will recognize that such terms are also used in a generic sense herein, and that the present invention is not limited to such systems.

Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 5:
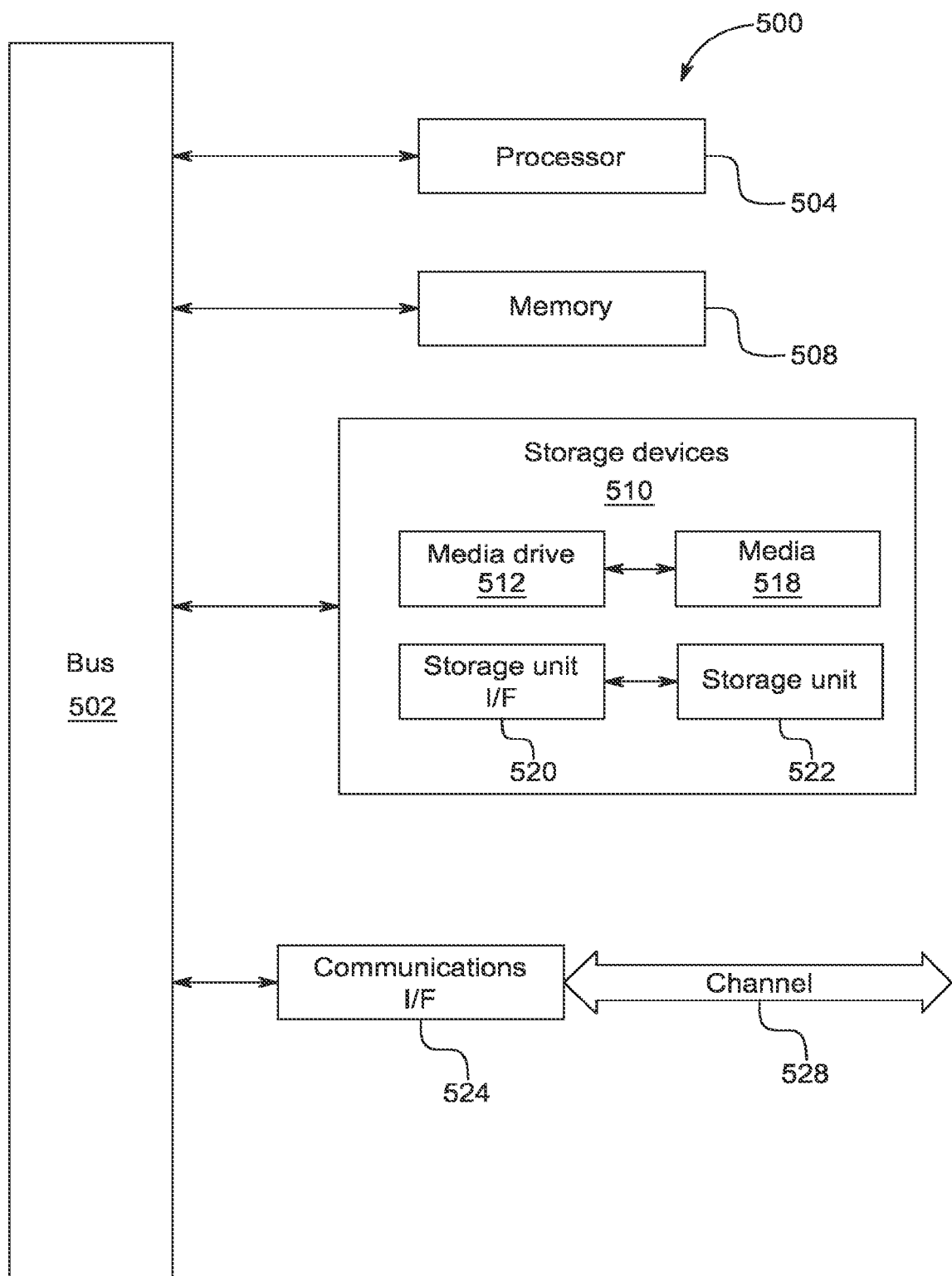
FIG. 5 illustrates a computer system that may be employed to implement embodiments of the invention.

FIG. 5 illustrates a typical computing system 500 that may be employed to implement processing functionality in embodiments of the invention. Computing systems of this type may be used in the radio controllers, the base stations, and the UEs, for example. Those skilled in the relevant art will also recognize how to implement the invention using other computer systems or architectures. Computing system 500 may represent, for example, a desktop, laptop, or notebook computer, hand-held computing device (PDA, cell phone, palmtop, etc.), mainframe, server, client, or any other type of special or general purpose computing device as may be desirable or appropriate for a given application or environment. Computing system 500 can include one or more processors, such as a processor 504. Processor 504 can be implemented using a general or special purpose processing engine such as, for example, a microprocessor, microcontroller or other control logic. In this example, processor 504 is connected to a bus 502 or other communications medium.

Computing system 500 can also include a main memory 508, such as random access memory (RAM) or other dynamic memory, for storing information and instructions to be executed by processor 504. Main memory 508 also may be used for storing temporary variables or other intermediate information during execution of instructions to be executed by processor 504. Computing system 500 may likewise include a read only memory ("ROM") or other static storage device coupled to bus 502 for storing static information and instructions for processor 504.

The computing system 500 may also include information storage system 510, which may include, for example, a media drive 512 and a removable storage interface 520. The media drive 512 may include a drive or other mechanism to support fixed or removable storage media, such as a hard disk drive, a floppy disk drive, a magnetic tape drive, an optical disk drive, a CD or DVD drive (R, or RW), or other removable or fixed media drive. Storage media 518, may include, for example, a hard disk, floppy disk, magnetic tape, optical disk, CD or DVD, or other fixed or removable medium that is read by and written to by media drive 512. As these examples illustrate, the storage media 518 may include a computer-readable storage medium having stored therein particular computer software or data.

In alternative embodiments, information storage system 510 may include other similar components for allowing computer programs or other instructions or data to be loaded into computing system 500. Such components may include, for example, a removable storage unit 522 and an interface 520, such as a program cartridge and cartridge interface, a removable memory (for example, a flash memory or other removable memory module) and memory slot, and other removable storage units 522 and interfaces 520 that allow software and data to be transferred from the removable storage unit 522 to computing system 500.

Computing system 500 can also include a communications interface 524. Communications interface 524 can be used to allow software and data to be transferred between computing system 500 and external devices. Examples of communications interface 524 can include a modem, a network interface (such as an Ethernet or other NIC card), a communications port (such as for example, a USB port), a PCMCIA slot and card, etc. Software and data transferred via communications interface 524 are in the form of signals which can be electronic, electromagnetic, optical or other signals capable of being received by communications interface 524. These signals are provided to communications interface 524 via a channel 528. This channel 528 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 508, storage device 518, or storage unit 522. These and other forms of computer-readable media may store one or more instructions for use by processor 504, to cause the processor to perform specified operations. Such instructions, generally referred to as "computer program code" (which may be grouped in the form of computer programs or other groupings), when executed, enable the computing system 500 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 500 using, for example, removable storage drive 522, drive 512 or communications interface 524. The control logic (in this example, software instructions or computer program code), when executed by the processor 504, causes the processor 504 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A first user equipment (UE) comprising:
a transmitter;
a receiver; and
a processor, operatively coupled to the transmitter and the receiver,
wherein:
the receiver and the processor are configured to receive a control message over a physical control channel in a first time slot, wherein the first time slot also includes a downlink shared channel, wherein the control message has power control bits for a plurality of UEs, wherein the plurality of UEs include the first UE,
the processor is further configured to extract power control information for the first UE from the control message, and
the transmitter and the processor are configured to transmit a signal over a physical control channel to a base station in a second time slot at a transmission power level based on the extracted power control information.

2. The first UE of claim 1 wherein the signal transmitted over the physical control channel is produced using a code sequence, wherein a plurality of UEs transmit in the second time slot using different code sequences.

3. The first UE of claim 1 wherein the transmitter and the processor are further configured to transmit data over a physical shared channel in a third time slot and the transmitter and the processor are further configured to not transmit the signal over the physical control channel at a same time that data over a physical shared channel is transmitted.

4. The first UE of claim 1 wherein the transmitter and the processor are further configured to transmit the signal over the physical control channel when time synchronized and to transmit a signal over a random access channel when not time synchronized.

5. A method performed by a first user equipment (UE), the method comprising:
receiving, by the first UE, a control message over a physical control channel in a first time slot, wherein the first time slot also includes a downlink shared channel, wherein the control message has power control bits for a plurality of UEs including the first UE;
extracting, by the UE, power control information for the first UE from the control message; and
transmitting, by the UE, a signal over a physical control channel to a base station in a second time slot at a transmission power level based on the extracted power control information.

6. The method of claim 5 wherein the signal transmitted over the physical control channel is produced using a code sequence, wherein a plurality of UEs transmit in the second time slot using different code sequences.

7. The method of claim 5 further comprising:
transmitting, by the first UE, data over a physical shared channel in a third time slot, wherein the UE does not transmit the signal over the physical control channel at a same time that data over a physical shared channel is transmitted.

8. The method of claim 1 further comprising:
transmitting, by the first UE, the signal over the physical control channel when time synchronized; and
transmitting a signal over a random access channel when not time synchronized.

9. A base station comprising:
a transmitter;
a receiver; and
a processor, operatively coupled to the transmitter and the receiver, wherein:
the transmitter and the processor are configured to transmit a control message over a physical control channel in a first time slot, wherein the control message has power control bits for a plurality of user equipments (UEs), wherein the plurality of UEs include a first UE,
the transmitter and the processor are also configured to transmit data over a downlink shared channel in the first time slot, and
the transmitter and the processor are further configured to receive a signal over a physical control channel from the first UE in a second time slot, wherein a power level of the received signal from the first UE is based on the transmitted message.

10. The base station of claim 9 wherein the processor is further configured to process the signal received over the physical control channel from the first UE based on a code sequence, wherein signals from a plurality of UEs are received in the second time slot using different code sequences.

11. The base station of claim 9 wherein the receiver and the processor are further configured to receive data over a physical shared channel in a third time slot.

12. The base station of claim 9 wherein the receiver and the processor are further configured to receive the signal over the physical control channel when the first UE is time synchronized and to receive a signal over a random access channel when the first UE is not time synchronized.

13. A method performed by a base station, the method comprising:
transmitting, by the base station, a control message over a physical control channel in a first time slot, wherein the control message has power control bits for a plurality of user equipments (UEs), wherein the plurality of UEs include a first UE;
transmitting, by the base station, data over a downlink shared channel in the first time slot; and
receiving, by the base station, a signal over a physical control channel from the first UE in a second time slot, wherein a power level of the received signal from the first UE is based on the transmitted message.

14. The method of claim 13 further comprising processing, by the base station, the signal received over the physical control channel from the first UE based on a code sequence, wherein signals from a plurality of UEs are received and processed in the second time slot using different code sequences.

15. The method of claim 13 further comprising receiving, by the base station, data over a physical shared channel in a third time slot.

16. The method of claim 13 further comprising:
receiving, by the base station, the signal over the physical control channel when the first UE is time synchronized; and
receiving, by the base station, a signal over a random access channel when the first UE is not time synchronized.

* * * * *